United States Patent
Michelsen

(10) Patent No.: US 9,128,694 B1
(45) Date of Patent: Sep. 8, 2015

(54) SYSTEM AND METHOD FOR LIVE SOFTWARE OBJECT INTERACTION

(75) Inventor: John J. Michelsen, Irving, TX (US)

(73) Assignee: INTERACTIVE TKO, INC., Dallas, TX (US)

(*) Notice: Subject to any disclaimer, the term of this patent is extended or adjusted under 35 U.S.C. 154(b) by 229 days.

(21) Appl. No.: 13/246,714

(22) Filed: Sep. 27, 2011

Related U.S. Application Data

(63) Continuation of application No. 11/328,423, filed on Jan. 9, 2006, now Pat. No. 8,060,864.

(60) Provisional application No. 60/642,004, filed on Jan. 7, 2005.

(51) Int. Cl.
*G06F 9/44* (2006.01)
*G06F 11/36* (2006.01)

(52) U.S. Cl.
CPC .............. *G06F 8/30* (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 5,642,511 A * | 6/1997 | Chow et al. | 717/105 |
| 5,867,707 A * | 2/1999 | Nishida et al. | 719/316 |
| 5,956,479 A * | 9/1999 | McInerney et al. | 714/38.13 |
| 5,958,008 A | 9/1999 | Pogrebisky et al. | |
| 5,999,988 A | 12/1999 | Pelegri-Llopart et al. | |
| 6,038,395 A * | 3/2000 | Chow et al. | 717/105 |
| 6,061,721 A | 5/2000 | Ismael et al. | |
| 6,134,581 A | 10/2000 | Ismael et al. | |
| 6,144,962 A | 11/2000 | Weinberg et al. | |
| 6,189,138 B1 * | 2/2001 | Fowlow et al. | 717/107 |
| 6,230,309 B1 * | 5/2001 | Turner et al. | 717/107 |
| 6,408,430 B2 * | 6/2002 | Gunter et al. | 717/109 |
| 6,427,230 B1 * | 7/2002 | Goiffon et al. | 717/108 |
| 6,463,578 B1 | 10/2002 | Johnson | |
| 6,490,719 B1 * | 12/2002 | Thomas | 717/107 |
| 6,558,431 B1 | 5/2003 | Lynch et al. | |
| 6,601,018 B1 | 7/2003 | Logan | |
| 6,601,020 B1 | 7/2003 | Myers | |
| 6,637,020 B1 * | 10/2003 | Hammond | 717/107 |
| 6,662,188 B1 * | 12/2003 | Rasmussen et al. | 1/1 |
| 6,684,387 B1 | 1/2004 | Acker et al. | |
| 6,785,882 B1 * | 8/2004 | Goiffon et al. | 717/120 |
| 6,895,578 B1 * | 5/2005 | Kolawa et al. | 717/130 |
| 6,920,609 B1 | 7/2005 | Manber et al. | |
| 7,055,137 B2 * | 5/2006 | Mathews | 717/125 |
| 7,065,745 B2 | 6/2006 | Chan | |
| 7,149,734 B2 * | 12/2006 | Carlson et al. | 1/1 |
| 7,240,328 B2 * | 7/2007 | Beckett et al. | 717/113 |
| 7,340,725 B1 * | 3/2008 | Robinson et al. | 717/124 |

(Continued)

OTHER PUBLICATIONS

LISA, 2.0 User's Guide, Interactive TKO, Feb. 27, 2003, pp. 1-130.

(Continued)

*Primary Examiner* — Lewis A Bullock, Jr.
*Assistant Examiner* — Christine Dang
(74) *Attorney, Agent, or Firm* — Patent Capital Group

(57) ABSTRACT

Systems, methods, apparatus and software can provide object interaction tools and techniques that allow a user to interact with a software object using familiar user interface elements. Information about the target object is provided so that an instance can be constructed. The object is introspect so available data and methods information can be used to populate a corresponding object interaction description and present an object interaction session.

27 Claims, 7 Drawing Sheets

(56) References Cited

U.S. PATENT DOCUMENTS

| | | | | |
|---|---|---|---|---|
| 7,350,191 | B1* | 3/2008 | Kompella et al. | 717/108 |
| 7,392,506 | B2* | 6/2008 | Garcowski et al. | 717/107 |
| 7,827,527 | B1* | 11/2010 | Chiluvuri | 717/109 |
| 8,028,272 | B2* | 9/2011 | Eldridge et al. | 717/110 |
| 2003/0009433 | A1* | 1/2003 | Murren et al. | 707/1 |
| 2003/0081003 | A1* | 5/2003 | Kutay et al. | 345/762 |
| 2004/0194064 | A1* | 9/2004 | Ranjan et al. | 717/124 |
| 2004/0237066 | A1* | 11/2004 | Grundy et al. | 717/104 |
| 2006/0265475 | A9 | 11/2006 | Mayberry | |

OTHER PUBLICATIONS

LISA, 2.0 Developer's Guide, Interactive TKO, Mar. 13, 2003, pp. 1-23.

Microsoft® Office, "FrontPage 2003 Product Guide," © 2003 Microsoft Corporation.

Robillard, M., "Representing Concerns in Source Code," available online at www.cs.ubc.ca/grads/resources/thesis/May04/Martin_Robillard.pdf> Nov. 2003 (139 pages).

Sagar, "Reflection & Introspection: Objects Exposed," Java developers' Journal, May 1, 1998, (pp. 1-16).

Doucet, et al., "Introspection in System-Level Language Frameworks: Meta-Level vs. Integrated," available online at delivery.acm.org/10.1145/1030000/1022756/187010382.pdf>. Mar. 2003 (pp. 1-6).

Beltrame et al., "Exploiting TLM and Object Introspection for System-Level Simulation," available online at delivery.acm.org/10.1145/1140000/1131515/p100-beltrame.pdf>, Mar. 2006 (pp. 100-105).

Wright, et al., "Introspection of Java™ Virtual Machine Under Simulation," available online at delivery.acm.org/10.1145/1700000/1698148/smli_tr-2006-159.pdf>. Jan. 2006 (pp. 1-26).

* cited by examiner

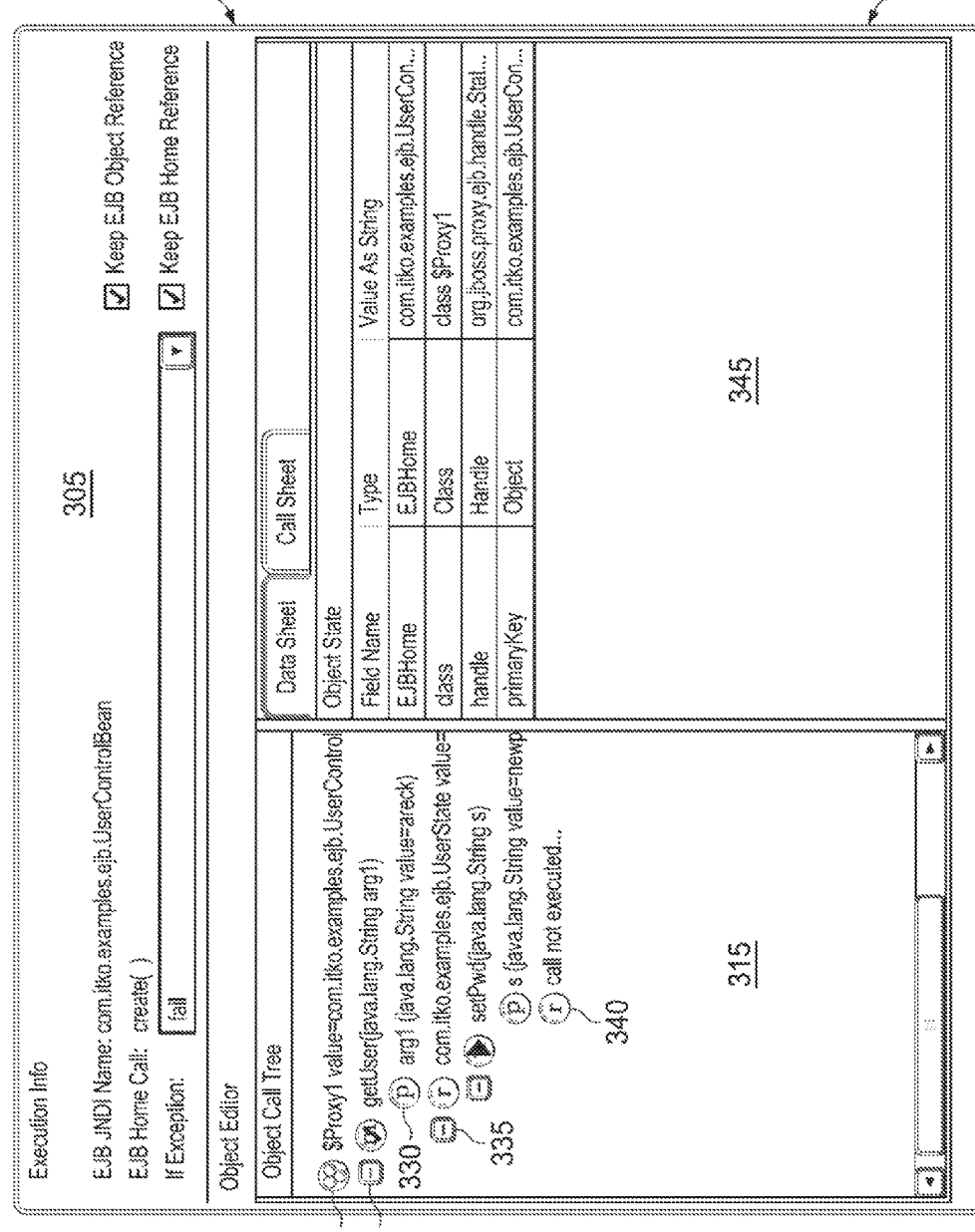

SYSTEM AND METHOD FOR LIVE SOFTWARE OBJECT INTERACTION

This application is a continuation and claims the benefit of priority under 35 U.S.C. §120 of U.S. application Ser. No. 11/328,423, filed Jan. 9, 2006 entitled "System and Method for Live Software Object Interaction", and naming John J. Michelsen as the inventor, which in turn claims the benefit of priority, under 35 U.S.C. §119 (e), of U.S. Provisional Application No. 60/642,004, filed Jan. 7, 2005, entitled "Executing Programming Logic in a Virtual Machine Via Live Interaction With the System's Objects," and naming John J. Michelsen as the inventor. The disclosure of the prior applications are considered part of and are hereby incorporated by reference in the disclosure of this Application.

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF THE INVENTION

The present invention relates to systems and methods for interacting with software objects, and particularly systems and methods that allow a user to interact with software objects using familiar user interfaces.

BACKGROUND OF THE INVENTION

Today, more and more software developers are choosing to write distributed transactional applications for the enterprise and leverage the speed, security, and reliability of server-side technology. Such distributed enterprise applications typically have to be designed, built, tested, and produced quickly, inexpensively, and with fewer resources than ever before. To reduce development costs and reduce enterprise application design and development time, various component-based platforms and approaches to the design, development, assembly, and deployment of enterprise applications have been developed.

Chief among these platforms are the Java 2 Platform, Enterprise Edition™ (J2EE) (more recently named the Java Platform, Enterprise Edition™ (Java EE)) from Sun Microsystems, Inc.™, and the .NET platform for web services and applications development from Microsoft Corporation™.

In general, such distributed application platforms provide a set of coordinated specifications and practices that together enable solutions for developing, deploying, and managing multi-tier server-centric applications. These platforms use object-oriented technology and a component-based approach to the design, development, assembly, and deployment of enterprise applications. Typical features include multitiered distributed application models, the ability to reuse components, a unified security model, and flexible transaction control.

The ability to develop software components that can be written once and re-used many times (in many different applications) means that reliability of component functionality is very important. Ensuring the integrity of the component product through thorough and high quality testing is therefore critical to developers. A common approach to assuring software quality is to perform extensive quality assurance testing QA late in the development process to test the end product. However, this approach can be counterproductive when testing component based systems. For example, defects in a software component that is used several different places in a distributed application can manifest themselves in numerous different ways, making it very difficult to trace the source of the defect back to the defective component. In short, quality cannot be ensured on a consistent basis unless testing is part of multiple stages in the development process.

Still another problem with software component testing is the complexity inherent in many prior art test techniques. For example, many software testing tools require users to develop complex testing scripts, include instrumentation code in the code to be tested, or otherwise require in-depth knowledge of the code under test. This typically means that fewer people can be involved in testing, e.g., those who authored the code under test are the only ones with sufficient knowledge or experience to use existing test tools. Moreover, because these prior art tools require authoring of some sort of code or script based testing logic, there is an increased likelihood that the testing software itself will have defects introduced in the authoring process.

Accordingly, to make testing part of multiple stages in the development process, simpler tools are desirable. Moreover, it is desirable to have tools that allow complex testing of software components without the need for extensive programming experience or the generation of complex testing code or scripts.

SUMMARY OF THE INVENTION

It has been discovered that systems, methods, apparatus and software can provide object interaction tools and techniques that allow a user to interact with a software object using familiar user interface elements. Information about the target object is provided so that an instance can be constructed. The object is introspected so available data and methods information can be used to populate a corresponding object interaction description and present an object interaction session.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIGS. 3A-3C illustrate examples of graphical user interface elements that can be used for object interaction.

DETAILED DESCRIPTION

Figure 1:
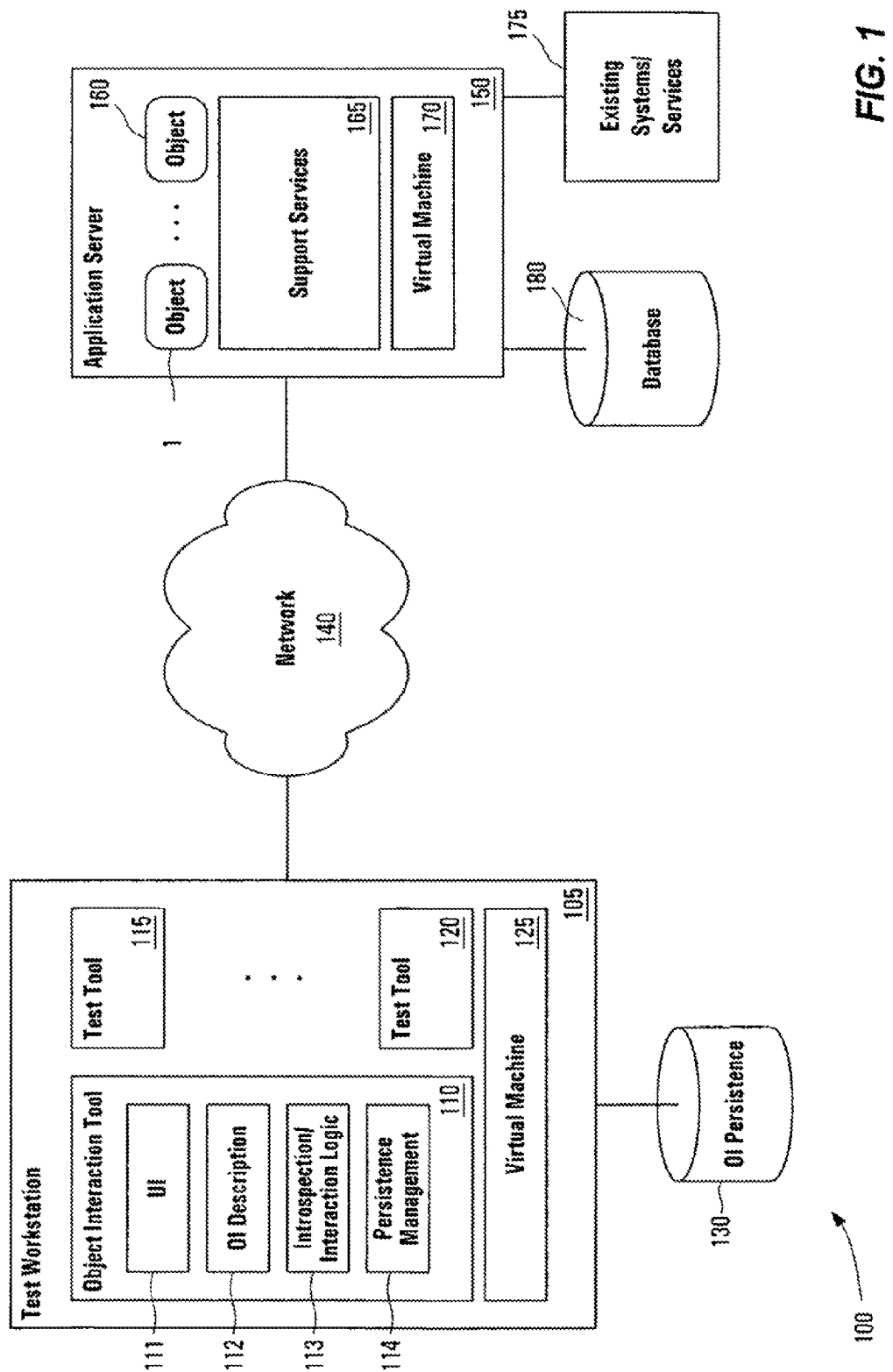
FIG. 1 illustrates a client/server computing environment utilizing software object interaction tools in accordance with the present invention.

The following sets forth a detailed description of at least the best contemplated mode for carrying out the one or more devices and/or processes described herein. The description is intended to be illustrative and should not be taken to be limiting.

Although the description below emphasizes systems, methods, apparatus and software for use in testing software components (variously referred to herein as "components" or "objects"), the disclosed techniques and tools can also be used to interact with components in contexts that are not, strictly speaking, software testing. Thus, for example, the tools and techniques of the present application allow a user to construct any sort of programming logic in a virtual machine via live interaction with objects that execute or exist in that virtual machine. While the interaction can be for the purpose of testing the object or a larger system to which the object belongs, the interaction can be for numerous other purposes such as: teaching object oriented programming skills, providing convenient access to object functionality for the object's intended use, creating a "program" by specifying a series of object interactions, documenting the functionality of objects, determining the suitability of objects or comparing objects provided by different vendors, prototyping distributed applications, and the like. The tools provide a user with the ability to select a starting point object that is available in the virtual machine, and using a familiar user interface, e.g., a graphical user interface or a simplified command line interface, users are able to interact with that object and any associated objects as desired. Creating an interaction like this with objects would typically require programming in a particular computer language, but the tools and techniques of the present invention prevent users from having to do so.

Although the description below emphasizes examples based on the Java™ component platform, various other component platforms such as the .NET platform can utilize the presently described object interaction tools and techniques. For example, the present application describes use of a J2EE™ compliant application server and client system using various components such as local Java™ objects, Java™ remote method invocation (RMI) objects, RMI/CORBA objects, JavaBean™ objects, Enterprise JavaBean™ (EJB) objects, objects with Java™ wrappers, web services, and the like. Such objects or services run directly or indirectly in a Java™ virtual machine executing on a corresponding client. Similarly, software objects written in various different languages such as C#, VisualBasic.NET™, C++, etc., can be compiled or interpreted into common intermediate language (CLI) objects that are then executed in Microsoft's™ common language runtime (CLR) virtual machine. Thus, the CLR along with various runtime .NET libraries, and any supporting services such as application servers provide another example of an environment in which object interaction tools can be used. Those having ordinary skill in the art will recognize that there are other virtual machines and corresponding object frameworks with which the object interaction tools of the present application can be used.

FIG. 1 illustrates a client/server computing environment utilizing the object interaction tools of the present invention. Computing system 100 includes a number of hardware and software components. Test workstation 105 is a computer system that executes object interaction tool 110. As shown, object interaction tool 110 is a program that operates within the context of a virtual machine 125, but in other implementations this need not be the case. Test workstation 105 also includes one or more other test tools 115-120 that can be used in conjunction with object interaction tool 110, and likewise can be implemented as programs designed to execute on test workstation 105 directly or within virtual machine 125.

For example, object interaction tool 110 and test tools 115-120 can all be part of a software testing package or environment such as the LISA™ 2.7 composite application testing software provided by ITKO, Inc. Such testing packages use object interaction tool 110 and other test tools to perform so-called "inline testing" to directly instrument and test key components of a distributed enterprise application. Thus, the various test tools can provide detailed analysis and test operation of objects, web services, websites, databases, middleware, and any other custom components. Numerous different types of testing enabled by these tools can, for example, include scenario-based testing, performance monitoring, integration testing, load testing, regression testing, and unit testing. As will be seen in greater detail below, object interaction tool 110 can be used to iteratively test multiple objects, services, etc. of a distributed system under the control of a test case manager (e.g., implemented as one of test tools 115-120). Results from such object testing can be used in testing other objects, logged for later analysis, monitored interactively, and the like. In still other examples, object interaction tool 110 is used in non-testing environments as described above.

Test workstation 105 is coupled to an application server 150 through a communications network 140, such as a local area network (LAN) and/or a wide area network (WAN) such as the Internet. Application server 150 and test workstation 105 can alternately be coupled to each other through point-to-point connections, or dedicated connections. In still other implementations, software for both the workstation and the application server execute on the same machine, e.g., under separate virtual machines or even the same virtual machine. Numerous different variations of these tools and techniques will be well known to those having ordinary skill in the art.

In general, application server 150 provides an environment that supports the execution of applications developed using a corresponding object framework. For example, application server 150 can be some implementation of a J2EE™ Enterprise JavaBean™ (EJB) server such as Sun Microsystems's™ Java System Application Server™, BEA System's™ Weblogic™ application server, IBM's™ Websphere™ application server, Borland Enterprise Server™, the JBoss™ application server, and the like. Application server 150 manages and coordinates the allocation of resources to the applications. EJBs™ and other objects such as programs in Java™ wrappers are represented in by objects 155-160. These objects are examples of objects with which object interaction tool 110 will interact.

For many distributed systems, application server 150 cooperates with or even incorporates other servers such as a web server, i.e., a hyper text transfer protocol (HTTP) server, configured to provide content using the well-known hyper text markup language (HTML). A typical web server provides one or more methods to forward a request to an application server such as server 150 and to return information to a user, including: Common Gateway Interface (CGI), Microsoft's™ Active Server Pages (ASP), Java Server Pages™ (JSP), and CORBA. Application server 150 is shown coupled to database 180 providing various data stores for the distributed application, and other systems/services 175 that may include the aforementioned servers, legacy systems, gateways to other systems, and the like. Thus various other aspects of the enterprise computing system can be part of system 100, but are not shown for convenience.

Application server 150 includes various support services 165 that are used to serve and maintain objects 155-160, as well as to support other aspects of the distributed applications. Such services include management of distributed transactions, management of distributed objects and distributed invocations on these objects, and low-level system services. Examples include: database connectivity support (JDBC), access to naming services (MIDI), XML processing support, web services (JAXM), security services (JSSE and JCE), remote access support (RMI), messaging services (JMS), scripting language support (JSP), and the like. In short, support services 165 provide the resources needed to support components such as objects 155-160.

Objects 155-160 execute within the context of virtual machine 170. This allows object interaction tool 110 to introspect object details via calls to virtual machine 170 as well as to execute bytecodes in support of object interaction functionality. Note that in some embodiments, objects with which object interaction tool 110 interacts are located on other application servers or even on test workstation 105 (e.g., a local Java™ object). In still other embodiments, application server 150 can implement non-object-oriented components or programs. However, object interaction tool 110 can still be used to manipulate these components as long as adequate introspection and code insertion facilities are available.

Object interaction tool 110 includes various different types of functionality 111-114. Thus, the modules may in fact be implemented as objects or components, or may be functional descriptions of the overall code base of object interaction tool 110.

User interface module 111 is the mechanism by which object features and related information are presented to a user, and also the mechanism by which the user makes selections, configures objects parameters, inspects object properties, and configures various aspects of tool operation. In many embodiments, user interface 111 is implemented as a graphical user interface (GUI) using well known user interface elements such as windows, buttons, pull down menus, slide-bars, text fields, file selection tools, tree representations, and the like. In some embodiments, a user can access object interaction tool 110 via a web server client or browser, e.g., object interaction tool 110 operates as an application server itself, and user interface 111 is part of a web server that presents an HTML, Flash, etc. user interface. In still other embodiments, some or all the functionality of object interaction tool 110 is accessed using a simple command line interface. Thus, various different user interfaces or combinations of user interfaces can be used as is well known to those skilled in the art. Examples of object interaction tool user interface elements are shown in FIGS. 3A-3C, and their use described in conjunction with the flow chart of FIG. 2. As these figures are merely example implementations, it should be recognized that numerous different interface configurations and techniques can be used to interact with live objects and to render the viewers and editors in a graphical view.

In order for the object interaction tool to maintain a complete description of an object interaction, properly persist a live object interaction with the objects referenced, and reconstitute that interaction at a later time for edit or execution, an object interaction description is maintained. Object interaction description module 112 provides the logic and/or data structure for maintaining that description. Changes in the object interaction, e.g., based on manipulation via user interface 111, resulting from object selection, introspection, etc., are maintained in an object interaction description. Object interaction descriptions are also typically used as the data model for a graphical user interface to render a view of the interaction. Object interaction descriptions typically do not include the target objects themselves, but usually do include class descriptions, object names and information needed for invocation, and data involved in the interaction. Objects are typically not included in the description because live interaction might be too fragile to changes in the underlying objects. However, in other embodiments object serialization techniques are used in conjunction with object interaction description formation. In general, object serialization is the process of encoding an object and saving its state to a sequence of bytes, as well as the process of rebuilding those bytes into a live object at some future time. For example, the Java Serialization API provides a standard mechanism for developers to handle object serialization, but as noted above it may be preferable to use objects constructed directly by the appropriate application server, i.e., invoke objects as needed or uses existing instances of objects, rather than recreating objects from a serialization.

In many embodiments, the object interaction description can be considered a meta-model of the object interaction. In general, a meta-model is an explicit model of the constructs and rules needed to build specific models within a domain of interest. A meta-model can be viewed from various different perspectives, e.g., as a set of building blocks and rules used to build models, as a model of a domain of interest, as an instance of another model. In this case, the meta-model serves the various purposes mentioned above, e.g., storing information about objects, data, and calls that are part of the interaction. Similarly, module 112 can be used to define the desired meta-model and produce instances of the meta-model corresponding to various object interactions. Moreover, the format of object interaction descriptions (e.g., the underlying meta-model) can vary significantly with the type of object with which the user interacts. For example, object interaction descriptions for EJBs may be fundamentally different from those for local Java objects, CLR objects, etc.

Object interaction descriptions are saved in object interaction persistence 130. The persistence mechanism and/or the object interaction description can be represented in the same manner, or represented in any various different ways. In some embodiments, XML data schema are used, but numerous other schemes can be used, such as pure text, generated script code in any language, or binary forms of many kinds. Object interaction persistence can be in the form of simple flat files, or more sophisticated forms such as a database maintained by a database management system. Thus, persistence management 114, e.g., simple file writing routines, database management systems (DBMS), etc., is used to load, save, and otherwise manage object interaction persistence. Examples of such DBMSs include IBM's™ DB2, Oracle Corporation's™ database management systems, Microsoft™ SQL Server™, Sybase IQ™, and the like, an can generally be relational or non-relational. Although schematically illustrated as a separate program/entity, persistence implementations can be integrated with other applications, such as object interaction tool 110. Thus, an object interaction persistence can take numerous different forms, as will be understood by those skilled in the art.

Introspection and interaction logic 113 provides the routines for discovering information about objects under test, making calls against those objects, and receiving/managing return values, whether those values are simple data values or invocations of other objects.

In general, introspection is the capability of a program to explicitly reveal or see, understand and modify its own structure. For instance, an introspective object-oriented language allows querying an object for its attributes and methods, their types and values. Introspection is typically enabled via a reflection property, i.e., object structure is reflected to the object itself. As noted above, the information describing the structure of the object is used to form the object interaction description. Programming languages and/or corresponding runtime environments such as the JVM and CLR provide such introspection, and object interaction tool 110 relies on the availability of some type of introspection to achieve object interaction. For example the reflection capabilities of the Java programming language make it possible to query a JVM to know the structure of an object within the JVM. To such a query, the JVM returns an object that is an instance of a meta class named Class, and this object fully describes the type of the object with structures for (1) inheritance information: references to another object of class Class that describe the base class; (2) attribute information: a set of objects of class Field that describes all attributes in the class and carries the type information and methods to get or set the value of an attribute; and (3) methods information: a set of objects of class Method that capture the information of all methods in the class and carry the type of a return value, parameter description, and can be used to invoke the method.

In addition to handling object introspection, introspection and interaction logic 113 performs other object interaction operations (e.g., using known software interfaces and communication protocols) such as invoking methods, executing methods based on user specified or default parameters, receiving results, and the like. As will be known to those skilled in the art, the specific techniques used vary somewhat among distributed application development platforms. For example, in the J2EE™ platform, interaction with an EJB™ is mediated by the application server managing the objects, i.e., the application server intercepts calls to the object and operating directly on the target object. An example of the object interface in Java™ is the aforementioned remote method invocation (RMI) system, which allows an object running in one virtual machine to invoke methods on an object running in another virtual machine. Objects built using RMI include interfaces and classes. The interfaces define methods, and the classes implement the methods defined in the interfaces and, perhaps, define additional methods as well. In this way, RMI provides for remote communication between programs written in Java™. In still other examples, target objects include a Java™ wrapper that is a set of classes acting as an interface between the object interaction tool and the underlying target object, which is often non-Java code. Other types of wrappers, e.g., CORBA shells, are well known to those having ordinary skill in the art.

Thus, operation of object interaction tool 110 can generally be summarized as follows. Once tool 110 knows the class of a target object, it will construct an instance of that class (or cause an instance to be constructed), introspect that class for all available data and methods, populate the corresponding object interaction description, and prepare a live interaction session with that object.

The various software entities of FIG. 1 (110-120, 155-165, etc.) are shown as separate software modules, objects, or programs. These various entities, and indeed any of the software described herein, can be variously combined into single software modules, implemented on separate computer systems, executed as separate threads on a single computer system, etc. Thus, the organization of the functional blocks and the hardware on which corresponding software is executed can be implemented in a variety of different ways as is well known in the art. In general, two or more of the various modules can execute on the same computer system, or on some combination of separate computer systems as desired. The types of computer systems on which such software can be implemented are described below in conjunction with FIG. 5.

Additionally, the examples described above generally focus on distributed applications. However, the object interaction tools and techniques described in the present application can also be used in environments that are not distributed, e.g., all target objects, the object resources, the object interaction tool, etc., operate on the same workstation. This could be the case in a testing scenario, or in other instances where the object interaction tool is used, such as basic object analysis, object programming, education, and the like.

Figure 2:
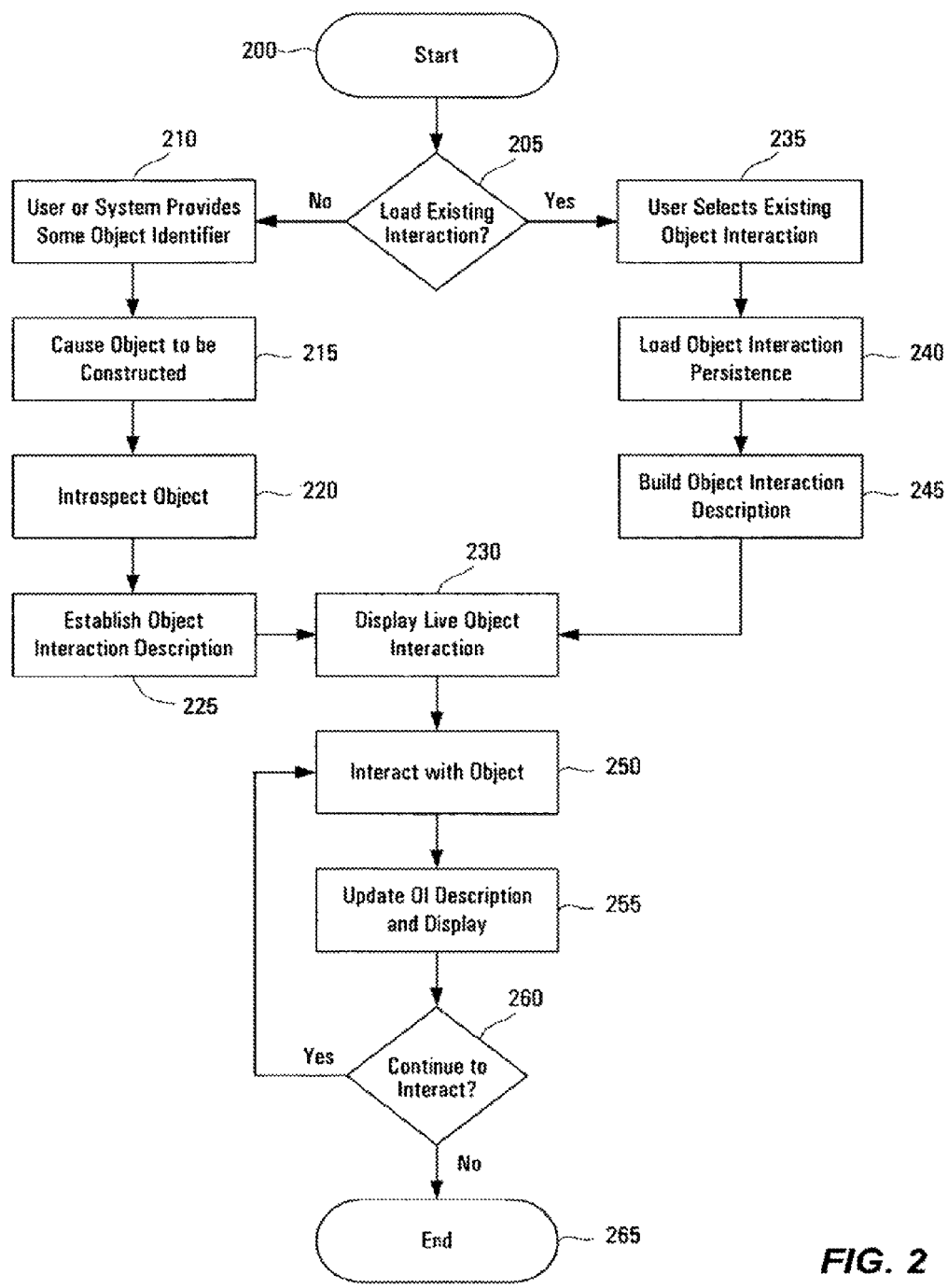
FIG. 2 is a flow chart illustrating object interaction tools and techniques in accordance with the present invention.
Figure 3B:
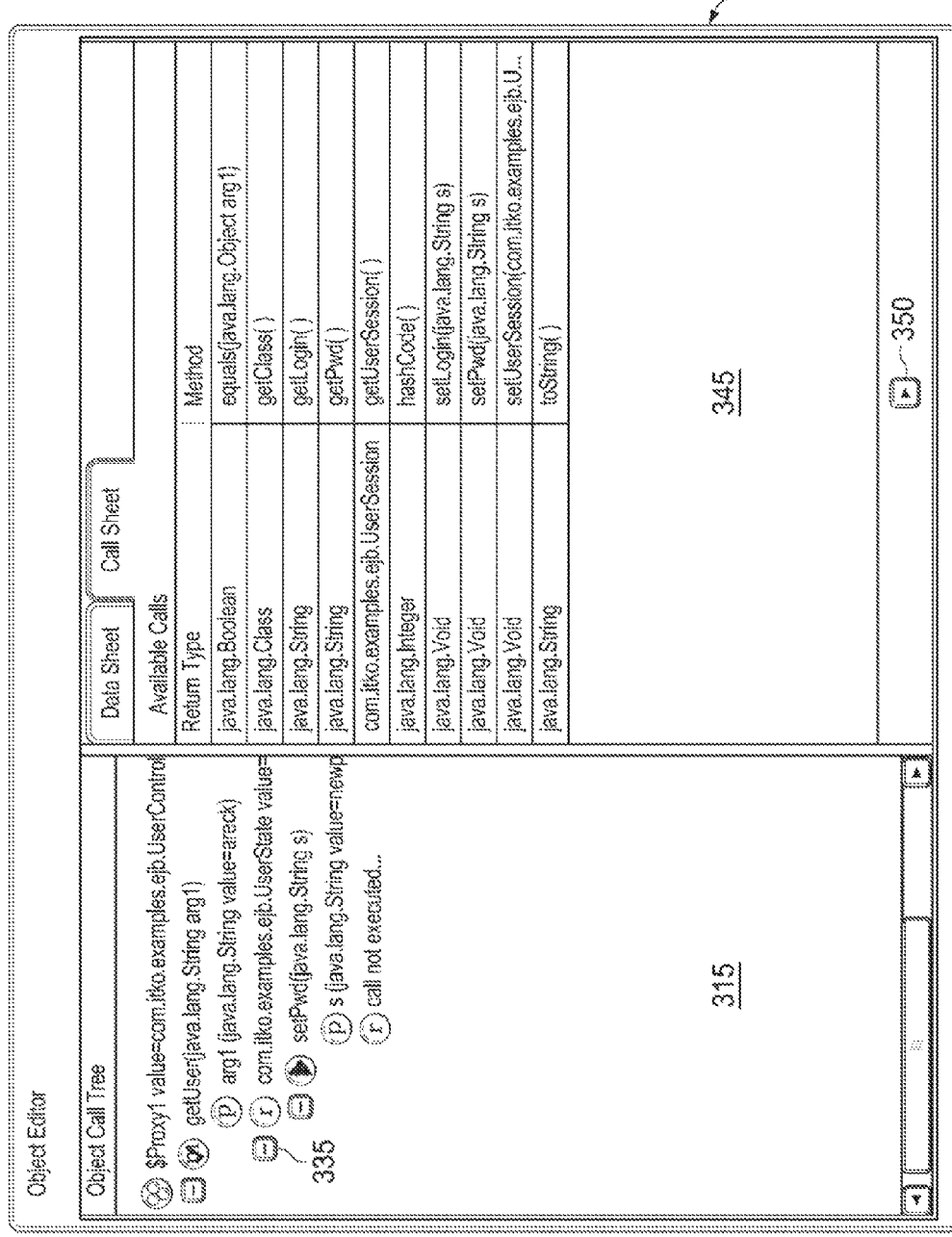
Figure 3C:
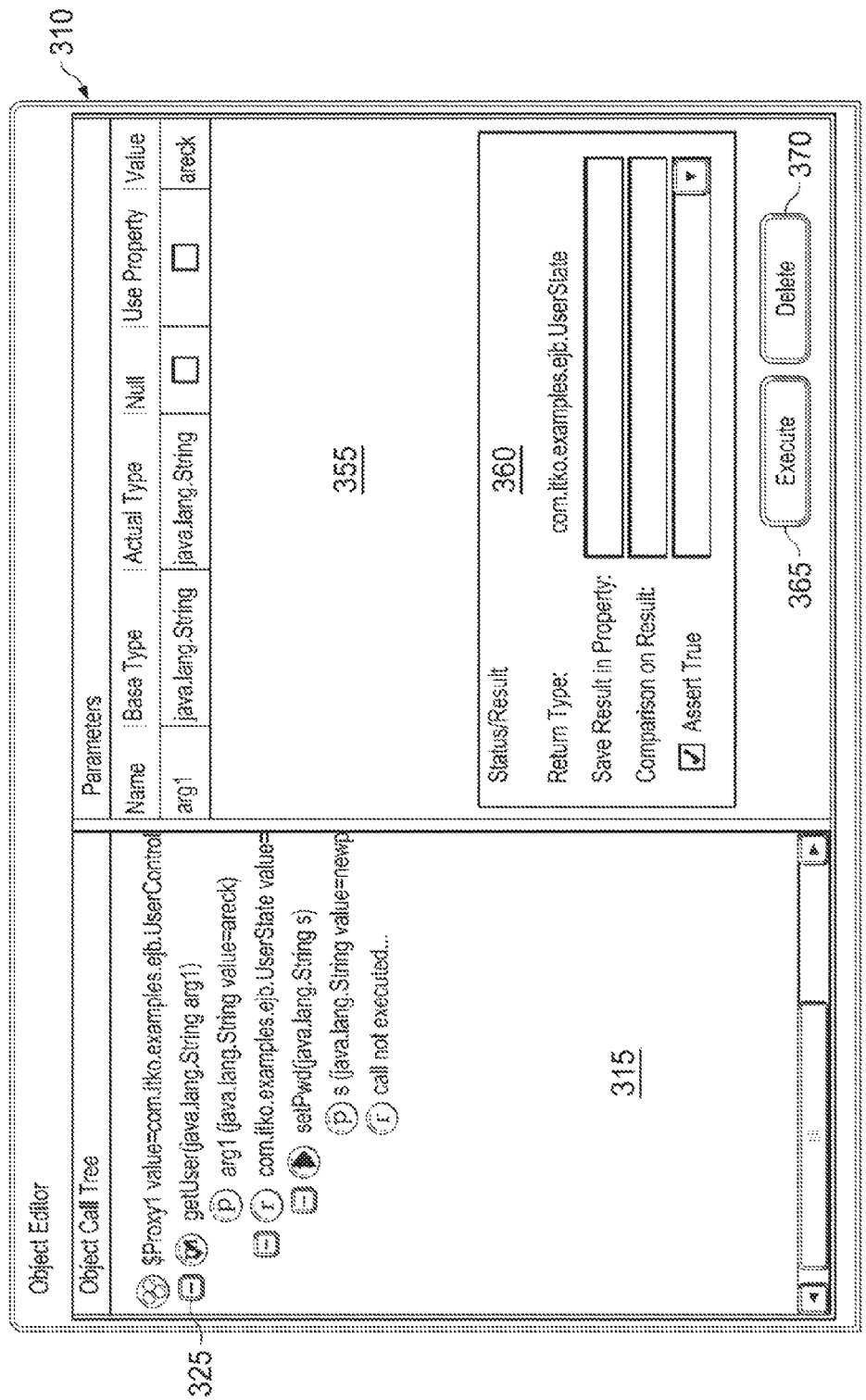

FIG. 2 is a flow chart illustrating some of the steps performed to initiate and use object interaction tools and techniques in accordance with the present invention. Various operations illustrated in FIG. 2 will be further described with respect to corresponding graphical user interface elements shown in FIGS. 3A-3B. Operation begins at 200, where it is assumed that the object interaction tool is operating and necessary resources (e.g., access to application servers, access to local objects, etc.) are generally available. Various different techniques can be used for allowing a user to execute the object interaction tool. For example, a user might explicitly execute the tool using a graphical user interface element, e.g., by selecting a menu item or clicking on an icon. A user might indirectly execute the tool by opening a document or operating a "wizard" process that causes execution of the object interaction tool. In still another example, the object interaction tool is executed by virtue of the fact that a test scenario (at least partially based on a pre-defined object interaction description and/or persistence) is being executed by a test system.

However the object interaction tool is started, a determination is made at 205 whether to load an existing object interaction. The manner of starting the object interaction tool may inherently determine the outcome of operation 205, but if not, a user will typically decide between creating a new interaction and selecting an existing interaction. If the user decides not to load an existing interaction description, operation transitions to 210 where the user can provide some target object identification information. If a new interaction is to be constructed, the class name of the first object involved in the interaction has to be acquired. This happens in a variety of different ways, including: the user provides the class name by typing it in via a user interface, the user is shown a graphical view of available classes and is allowed to select the desired class, a user is given a wizard-like screen from which the appropriate class is selected by the tool based in part on information provided by the user.

Since the object with which to interact can be remote from the device on which the object interaction tool executes, additional object related information can be specified. For example, a user can specify the host name, IP address, or port number corresponding to the application server providing the remote object. Since the manner in which the object interaction tool operates can differ depending on the specific type of application server, the user can also provide additional information about the application server, for example, by specifying the particular software package being used (e.g., Java™ System Application Server, Weblogic™ application server, Websphere™ application server, Borland Enterprise Server™, JBoss, etc. in the case of EJB™ servers). Moreover, remote application servers may support certain access or security features, e.g., a username and password, that must also be specified. In still other examples, the object with which to interact is remote, and a user might have to specify path names and the like to the object interaction tool. Various different user interface elements such as pulldown or pick menus, text fields, file or path browsing interfaces, etc., can be used to provide the object interaction tool with requisite information. In still other embodiments, such information can be specified by default.

Note that some or all of the object identification information can be retained in and becomes part of the object interaction description. Similarly, at various points in the process illustrated in FIG. 2, e.g., where object information is obtained, introspection, tool configuration, method call parameter specification, result receipt, etc., relevant information can be recorded and/or changed in the object interaction description. Additionally, the object interaction tool can be configured to periodically save this information in non-volatile form, and/or save it when explicitly requested by the user.

Next in 215, the object interaction tool causes the object to be constructed either directly, e.g., constructing an instance of the class, or indirectly, e.g., making a similar call to an application server which intercepts the call and constructs an instance of the class itself. In some cases, there can be multiple ways to construct a particular object. Consequently, the object interaction tool can present the user with various options from which to select. For example, the tool can present the user with a graphical user element listing various options (and perhaps information about the options and/or their differences), and the user can select the desired construction by selecting a radio button in the interface. In other embodiments, the tool can complete the operation without user involvement by using a default construction or determining the most appropriate construction based on various parameters.

Once the target object is constructed by whatever means appropriate, the object's class is introspected (220), as described above, to determine information about available data and methods and prepare a live interaction session with that object. Based on the results of the introspection operations, a relatively complete object interaction description is established in 225. The object interaction description provides the data model used for the graphical user interface renderer.

Returning to determination 205, if an existing stored object interaction is to be used, operation transitions to 235. Here, a user provides the name or location of an existing object interaction to be displayed and used. As above, various different user interface elements and techniques can be used (e.g., an icon, mouse-based menu, command key, etc.) to provide requisite information. Once selected, the persistence of the prior object interaction can be loaded (240) from one or more various sources, e.g., from disk, from across the network, or from an embedded instance in another documents. The persistence of all the objects, calls, and data involved in this interaction are dynamically loaded into an object interaction description data structure (245). As noted above, in some embodiments the persistence of the object interaction description is simply a copy of the object interaction description originally constructed by the object interaction tool. As necessary, the base object itself is constructed by whatever means was requested by the user or system originally. Note that operation 245 can include additional steps such as re-introspection of the target object. In still other examples, it is sufficient to confirm that the object remains in existence from a previous construction. Upon completion of 245, existing calls and data changes are made available but are unexecuted.

Whether as a transition from 225 or 245, a live object interaction is displayed in 230 based on the information in the object interaction description. FIGS. 3A-3C illustrated some of the many possible examples of such an interaction display. In general, each object involved in the interaction is illustrated in the display. Similarly, method calls and data changes are also displayed. Note that these calls and data changes are not shown via a script or other lines of programming logic. They are instead viewed in graphical form, such as a tree hierarchy as shown, and they are manipulated using an interface well familiar to computer users. In general, both existing calls and data changes that may have already been made are shown, as well as available calls and data that may be invoked. The tool also displays all executed calls and their return data or objects. If these objects have data or calls within them, they too are shown.

Turning specifically to FIG. 3A, object interaction tool display 300 is shown. Note that the examples of FIGS. 3A-3C illustrate interaction with an EJB, but similar types of interactions can be performed with numerous different types of objects and services. This example includes a window, panel, or frame specific to execution information (305) and an object editor panel 310. Execution information panel 305 provides basic information about the relevant application server and the specific call. It also provides an interface for specifying exception handling. This is particularly useful if the object interaction is one element (or node) among many such elements or different elements in a series of tests. For example, the present object interaction can be configured to simply fail (as illustrated), meaning that an error is reported and/or operation of an iterative test moves to a designated fail node when an exception occurs. Various other activities can be selected, or other nodes in an interactive test specified. Additionally, other execution related parameters (e.g., retaining references to objects, etc.) can be specified.

Object editor 310 includes an object call tree display 315. This is one of many ways in which an object interaction can be rendered on screen. Object call tree 315 shows the interaction as a tree with the constructed base object as the trunk of the tree. Each call made on that object is an immediate branch from the trunk. Calls made on results of those calls are branches from those branches, and so forth. As the user selects a branch or leaf in this panel, the associated screen reflects a rendered editor or viewer for that element in the right hand panel (345).

Base object trunk 320 is the top of the tree so the user knows that this is the base object upon which interaction is based. Shown is an icon that depicts the fact that it is a base object upon which calls can be made. The accompanying text is a human-readable message about the object. Note that although only one base object is shown, object interactions can have multiple base objects. In this example, base object trunk 320 has been selected (as illustrated by the fact that it is highlighted), and thus the particular display in panel 345 provides specific information about the selected object. Panel 345 provides several different types of information, as indicated by the tabbed display elements. The illustrated data sheet provide specific information about the selected object, e.g., its location, class information, and other reference information. In some cases, this information could be edited in panel 345, or various parameters and/or option selected using well known graphical user interface elements.

Base object trunk 320 has a corresponding method call entry called "getUser" (325) that has already been selected from the methods available in the chosen class. An appropriate icon (in this case indicating that the method call is complete) and text to describe that call are therefore placed at the appropriate location in the object call tree. Selecting this object call tree leaf will, in turn, cause a corresponding panel to be displayed in panel 345. For example, if a method call leaf is selected, panel 345 can display information about the parameters associated with the call such as names, types, property values, status information, etc. In some cases, there may be no parameters to specify for a particular method call. However, if a method call requires parameters, the object call tree will auto-populate with the needed parameter's entries, one for each parameter required. In this case, method call getUser has one parameter "arg1" (330). Here again, an appropriate icon (a parameter icon) and text describing the parameter and/or its value are included in the display. Selecting this object call tree leaf will, in turn, cause a corresponding panel to be displayed in panel 345. For example, if a parameter leaf is selected, panel 345 can display parameter value type information, display associated property key information, and provide a mechanism (e.g., a text field) to specify a particular value for the parameter.

Since FIG. 3A illustrates a situation where the call to getUser has already been made, the resulting object returned by the call is reflected in the object call tree. Resulting object 335 is illustrated with a results icon and information describing the result. As result 335 is itself an object, it may have one or more corresponding calls, parameters, and results, that are also illustrated in the object call tree. The presence of the resulting object means that calls can be made against that object. Note that response leaf 340 illustrates an example where the corresponding method call has not yet been made.

As seen from the sample display of FIG. 3A, the process of displaying an object interaction can depend on numerous interaction features, and can also vary from one object interaction description to another. Thus, the object upon which an object interaction description is based can affect the interaction display in numerous ways. FIG. 3A shows how the presence or absence of different object features changes the object call tree and potentially leaf display information in panel 345. Additionally, different types of objects can have very different types of object interaction descriptions, which in turn yield very different rendered user displays. Interface elements shown in FIG. 3A may not be applicable to other objects, and vice versa. In short, the user interface can include whatever elements are needed or useful for object interaction.

Returning to FIG. 2, once the initial object interaction display is rendered (230), a user can interact with the object (255) via the displayed user interface. Examples of such interaction include: adding or removing method calls, learning information about available method calls, modifying existing method calls, editing data fields in objects and calls, executing or re-executing calls, and performing basic interaction management (e.g., saving the interaction, exporting it, etc.). Note that some aspects of this interaction are described above in connection with FIG. 3A.

FIG. 3B illustrates user interface options for determining available calls for a method and adding method calls. In this example, resulting object 335 has been selected in object call tree 315. Additionally, a corresponding call sheet has been selected for display in panel 345. The call sheet lists all of the available calls corresponding to the selected object. In addition to listing the method names, return types for each of the calls are shown. This screen documents for the user every available call that may be invoked on the object selected. It shows a human-readable form of those calls, their parameters, and the object returned, if applicable. In still other examples, links to method documentation or direct information about method documentation can also be provided. If a user wanted to select an additional method to call (note object call tree 315 already shows the method setPwd as being called), he or she would highlight to appropriate method shown in 345 and select invoke method button 350.

FIG. 3C illustrates user interface options for editing method calls. When method call getUser was added to the object being invoked, an appropriate leaf was inserted into object call tree 315. In this example, a user has selected the getUser call 325 in the tree. In response, the object interaction tool presents call editor panels 355 and 360. Here, panel status result panel 355 illustrate features that might be specific to use of the object interaction tool in a test system that tests the execution of the object. Panel 355 shows how response objects can be saved by name for later use and how challenges can made on that response for testing purposes. Thus, the code-free interaction metaphor is extended to other elements of a testing process. The object interaction tool provides a code-free way to execute the call with whatever parameters are desired and to challenge the response of that call as desired or save it for use by another aspect of the test system. Panel 360 illustrates a parameter panel where various method call parameters are documented and available for editing. A row is presented for each method call parameter. Values and settings are made familiar user interface elements such as text fields, check boxes, and the like. Selected method calls can be executed (365) and deleted (370) as desired.

As a user interacts with the object (250), the object interaction description is updated and the corresponding interaction display is updated (255). If the user desires to continue to interact with the object (e.g., as evidenced by continuing to manipulate the user interface as described), the process flow returns to 250. If instead, the interaction is completed as determined in 260, the object interaction process terminates 265. Termination typically occurs after the object interaction description is persisted in some form, or when the user chooses not to save the object interaction.

One useful application of the object interaction tool is to define object interactions that can subsequently be reconstituted as part of a larger test of a distributed application, or at least a test of various components of a distributed application. In some embodiments, the reconstitution or execution of a saved object interaction represents one node among many nodes in a test chain. For example, a test case node can be an element test case chain that represents an instruction to perform one test action in a test case. The aforementioned LISA™ composite application testing software is an example of a testing tool (or set of testing tools) that executes such test cases built from nodes. Nodes can generally have any type of operation. For example, one node might describe how to test a query against a database, while another tests the display of that information in a web page. Examples of node types supported by LISA™ include: dynamic Java™ execution, end test normally, EJB™ execution, external command execution (e.g., batch files, etc.), fail and end test, HTTP/HTML request, output log message, RMI server execution, raw SOAP request, read result from stream (e.g., file, URL, or classpath), SQL™ database execution, save property as last response, and web service execution. Although all nodes are not necessarily defined by or edited with a tool such as the object interaction tool, many are. Moreover, those nodes that do represent object interactions can utilize object interaction tools during the execution of the test case. For example, test execution can be suspended after executing a node describing an EJB™ interaction, the EJB™ interaction node can be modified using the object interaction tool, and the test case, including the newly modified node can be re-executed. Consequently, the reconstitution or re-execution of an object interaction is an important aspect of object interaction use.

Figure 4:
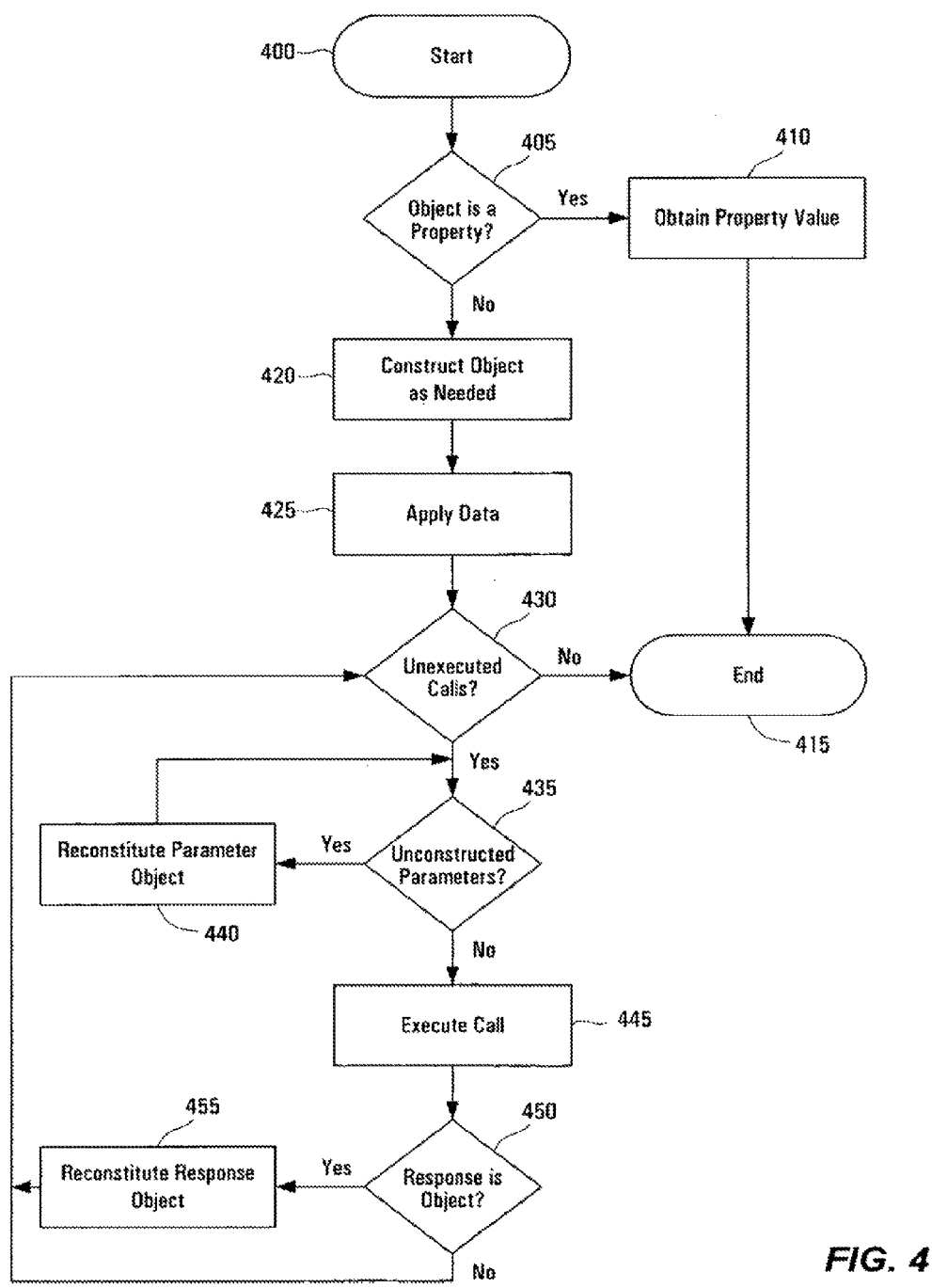
FIG. 4 is a flow chart illustrating aspects of object and object interaction reconstitution in accordance with the present invention.

FIG. 4 illustrates aspects of object and object interaction reconstitution from some persistence. Reconstituting the object interaction is roughly analogous to running a program if a user had written the program with a scripting or programming language. It has the effect of constructing all the objects and making all the calls represented in the object interaction description in the precise order needed. As noted above, this is particularly useful in the context of application testing, but reconstitution can be used in various other situations. Operation begins at 400 where it is assumed that the object interaction description has been created from a persistence of a previous object interaction session, or the authoring of a manual one by a user. This persistence may be in a variety of forms, such as some binary format or XML.

Next in 405, it is determined whether the object that is the subject of the object interaction description has been saved as a property, and therefore does not need to be reconstructed. If that is the case, operation transitions to 410 where the property value is obtained. Since the object is not to be constructed from scratch but is instead to be dynamically fetched from the running state of the program, the rest of the reconstitution process is bypassed, and the process terminates at 415. In general, a "property" as used in this context is a name-value pair used to identify a dynamic element. In a simple example, if a website login script is to be tested, instead of defining multiple versions of the relevant URL, each having the same host and script information, but differing by the actual values used for the username and password, a single URL expression can be constructed using properties such as USERNAME and PASSWORD. Testing logic can then be used to replace the specified property with an actual value. As this example illustrates, properties can be set explicitly using data sets. However, a property can also be established based on the return object from a method call. Referring back to FIG. 3C, recall that the object interaction tool can be used to specify that the result of a method call (in this case a call of the method getUser) be stored in a property. If this option is selected, the corresponding object interaction description will retain desired property information. This use of the properties system extends its value beyond that illustrated in the simple example above. If the object is marked as a property, then the property value can be fetched from the external state mechanism and provided as the value of the object being reconstituted.

If the object is not a property as determined in 405, operation transitions to 420 where the object is reconstructed as needed. The object interaction description contains the name of the class that needs to be constructed. The object is constructed based on any previously selected constructor as objects some times have more than one available way to be constructed. Note that in some cases, the object may already be constructed. One such example is a recursive reconstitution operation where the resulting object from a method call executed on a constructed object is in fact the already constructed object. Object construction can happen in any of the ways described above, and those having ordinary skill in the art will understand that there are numerous ways in which objects can be constructed.

Next, operation transitions to 425 where any relevant data to be used by calls to the object is applied/loaded. For example, if there are user defined data values that are to override the default values set on the object at construction, those values are selected from the object interaction description and applied here In practice, this operation can include executing a call that will cause the desired effect or directly manipulating the object's data members. Operation 430 determines whether there are remaining unexecuted method calls described in the object interaction description. This starts an iteration over any calls that have been defined for this object. The call execution order is usually significant, and execution follows the order that is defined in the object interaction description. If there are no unexecuted method calls, the process terminates at 415. If there are unexecuted method calls, operation transitions to 435 where a determination is made as to the need to construct parameters for the unexecuted method calls. Method calls may have zero or more parameters that are required. For each parameter that is needed, this process iterates to reconstitute those parameters. So, if the determination in 435 is yes, the parameter object is reconstituted in 440. In the simplest cases, the parameters are simply values that are fetched from the object interaction description or from elsewhere. In more complex situations, the parameters are themselves method calls, and process 440 is essentially a replication of the entire process illustrated in FIG. 4. Upon parameter reconstitution, operation returns to 435.

When there are no remaining unconstructed parameters and all need parameters are available, operation transitions to 445 where the completed method call is executed. If the result of the method call is itself an object that needs to be reconstituted, as determined in 450, that reconstitution occurs in 455. As with operation 440, operation 455 can be a complete replication of the entire reconstitution process illustrated in FIG. 4, only now the newly returned object is the target of reconstitution. When that process is complete, of if the object returned by the method call in 445 does not itself need to be reconstituted, operation returns to 430.

The flow charts of FIGS. 2 and 4 illustrate some of the many operational examples of object interaction tool usage disclosed in the present application. Those having ordinary skill in the art will readily recognize that certain steps or operations illustrated in FIGS. 2 and 4 can be eliminated or taken in an alternate order. Moreover, the methods described throughout this application (including FIGS. 2 and 4) are typically implemented as one or more software programs encoded in a computer readable medium as instructions executable on a processor. The computer readable medium can be any one of an electronic storage medium, a magnetic storage medium, an optical storage medium, and a communications medium conveying signals encoding the instructions. Separate instances of these programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Figure 5:
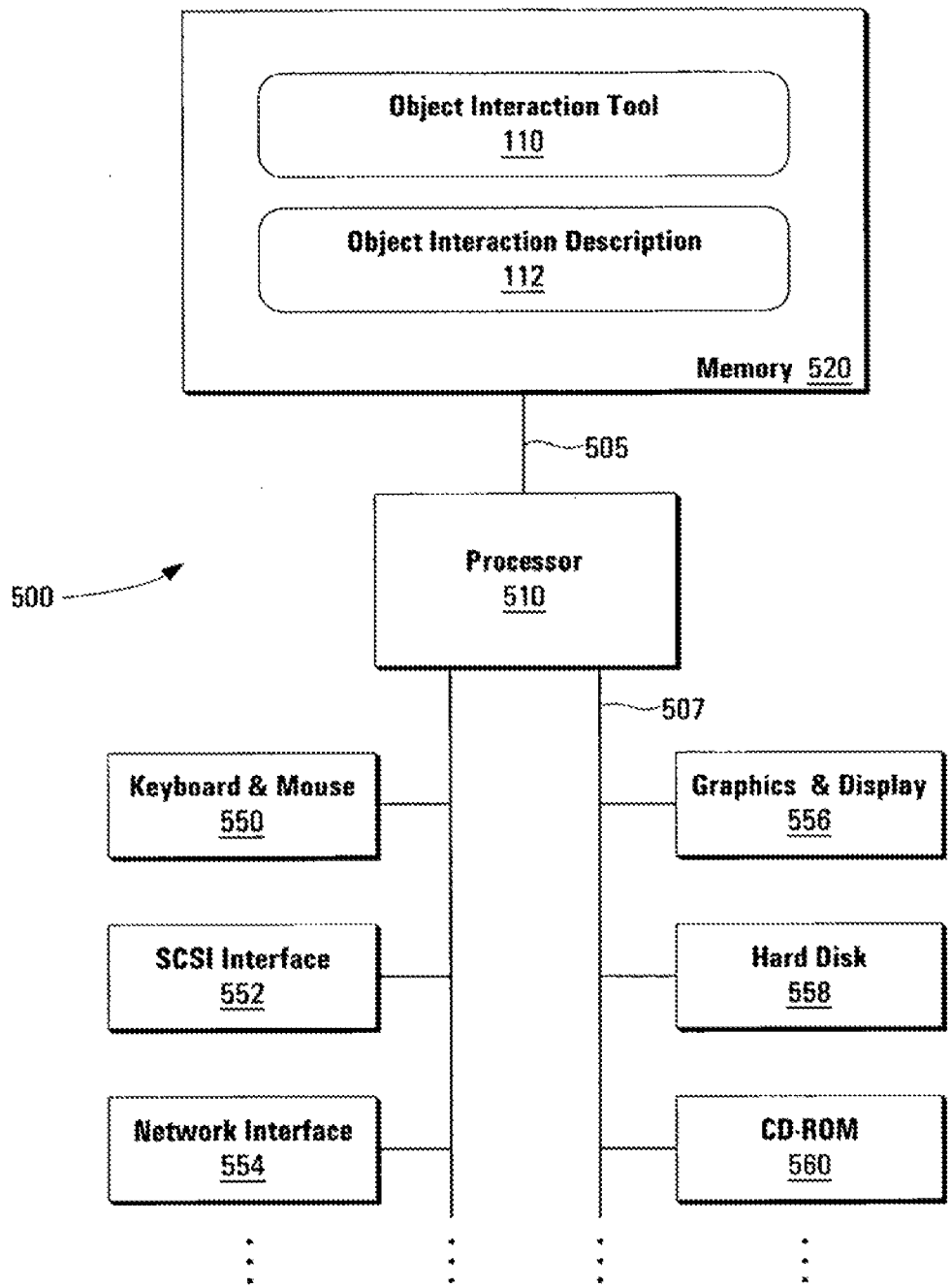
FIG. 5 is a simplified block diagram of a computer system for implementing the techniques of the present invention.

FIG. 5 illustrates a block diagram of a computer system 500 for implementing the techniques of the present invention. For example, computer system 500 can be an embodiment of one of the previously described servers or client computer systems. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor and or data, e.g., 110 and 112. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, computer languages such as C, C++, C#, Java, JavaScript, VBScript, JScript, PHP, and CLI/CLR. Additionally, software 110 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown.

Although the present invention has been described with respect to specific embodiments thereof, various changes and modifications may be suggested to one skilled in the art and it is intended that the present invention encompass such changes and modifications as fall within the scope of the appended claim.

What is claimed is:

1. A method comprising:
    constructing an instantiation of a first software object within a virtual machine in a particular software interaction session, the virtual machine executing on a particular computing device;
    identifying information pertaining to the first software object from the instantiation, the information including at least one first method of the first software object;
    generating a first object interaction description, wherein the first object interaction description is populated with at least a portion of the identified information, the first object interaction description modeling interactions of a user with the first software object within the particular software interaction session;
    providing a user interface for the particular software interaction session, the user interface presenting graphical representations of software object interactions within the particular software interaction session, wherein the particular graphical representation is generated, at least in part, from the first object interaction description and includes a first graphical representation of the first software object;
    identifying a user interaction with the displayed particular graphical representation defining a first interaction with the first software object;
    updating the first object interaction description to identify aspects of the first interaction, wherein the object interaction description aspects comprise information to allow replication of the first interaction on first software object; and
    using the first object interaction description to perform an instance of the first interaction on the instantiation of the first software object, wherein performing the instance of the first interaction causes interaction results to be generated.

2. The method of claim 1, further comprising automatically updating the user interface to include at least one graphical representation of the first interaction.

3. The method of claim 2, wherein the first object interaction description is populated with at least a portion of the interaction results.

4. The method of claim 3, wherein the first interaction includes a call of the first method, the first interaction causes invocation of the first method at the instantiation of the first software object, and the interaction results include identification of return values of the called first method.

5. The method of claim 4, wherein the return values include another second software object and populating the first object interaction description with interaction results includes:
    constructing an instantiation of the second software object within the virtual machine;
    identifying second information pertaining to the second software object from the instantiation, the second information including at least one second method of the second software object.

6. The method of claim 5, wherein users are able to specify interactions with the second software object through the updated particular graphical representation, the updated particular graphical representation including a graphical representation of the second software object.

7. The method of claim 4, wherein the updated particular graphical representation includes graphical representations of each of the call of the first method and the return values of the called first method.

8. The method of claim 4, wherein the first interaction includes receiving, via the user interface, user-specified parameters for the first method call, and the first method is invoked using the user-specified parameters.

9. The method of claim 1, wherein the first object interaction description is adapted, to reconstitute at least the first interaction.

10. The method of claim 9, wherein reconstituting objects interactions from the first object interaction description includes dynamically loading all objects, method calls, and data involved in interactions documented in the first object interaction description.

11. The method of claim 1, wherein the first object interaction description includes data documenting a plurality of method calls specified through user interactions with the user interface, the plurality of method calls include the call to the first method, the first object interaction description is adapted to reconstitute the plurality of method calls, and reconstituting the plurality of interactions includes constructing instantiations of each object involved in the plurality of method calls and calling each of the plurality of methods in an order defined in the first object interaction description based at least in part on the user interactions.

12. The method of claim 1, further comprising using the first object interaction description to invoke the first interaction on a live version of the first software object.

13. The method of claim 1, wherein the first object interaction description comprises a single node of a test case, wherein the test case includes a plurality of nodes.

14. The method of claim 13, wherein opening the test case causes the particular interaction session to be reconstituted from the first object interaction description.

15. The method of claim 1, wherein interactions within the particular interaction session include at least one of adding a method call, removing a method call, modifying an existing method call, editing data fields in an object, editing data fields in a method call, executing a method call, and re-executing a method call.

16. The method of claim 1, wherein identifying information pertaining to the first software object from the instantiation includes performing an introspection of the first software object using the virtual machine.

17. The method of claim 1, wherein the first software object is persisted remote from the computing device executing the virtual machine.

18. The method of claim 17, wherein the information includes at least one of a host name, IP address, or port number corresponding to an application server providing the first software object.

19. The method of claim 1, wherein the information is sufficient to permit invocation of a live version of the first software object.

20. The method of claim 1, wherein the information comprises less than the entirety of the first software object.

21. The method of claim 20, wherein the information includes a serialization of the first software object.

22. The method of claim 1, further comprising creating an executable program from a plurality of object interaction descriptions including the first object interaction description, each object interaction description in the plurality of object interaction descriptions corresponding to a respective software interaction session within a virtual machine.

23. An article comprising non-transitory, machine-readable media storing instructions operable to cause at least one processor to perform operations comprising:
  constructing an instantiation of a first software object within a virtual machine in a particular software interaction session, the virtual machine executing on a particular computing device;
  identifying information pertaining to the first software object from the instantiation, the information including at least one first method of the first software object;
  generating a first object interaction description, wherein the first object interaction description is populated with at least a portion of the identified information, the first object interaction description modeling interactions of a user with the first software object within the particular software interaction session;
  providing a user interface for the particular software interaction session, the user interface presenting graphical representations of software object interactions within the particular software interaction session, wherein the particular graphical representation is generated, at least in part, from the first object interaction description and includes a first graphical representation of the first software object;
  updating the first object interaction description to identify aspects of the first interaction, wherein the object interaction description aspects comprise information to allow replication of the first interaction on first software object; and
  using the first object interaction description to perform an instance of the first interaction on the instantiation of the first software object, wherein performing the instance of the first interaction causes interaction results to be generated.

24. A system comprising:
  at least one processor device;
  at least one memory element; and
  an object interaction tool, adapted when executed by the at least one processor device to:
    construct an instantiation of a first software object within the virtual machine;
    identify information pertaining to the first software object from the instantiation, the information including at least one first method of the first software object;
    generate a first object interaction description, wherein the first object interaction description is populated with at least a portion of the identified information, the first object interaction description modeling interactions of a user with the first software object within the particular software interaction session;
    provide a user interface for the particular software interaction session, the user interface presenting graphical representations of software object interactions within the particular software interaction session, wherein the particular graphical representation is generated, at least in part, from the first object interaction description and includes a first graphical representation of the first software object;
    identify a user interaction with the displayed particular graphical representation defining a first interaction with the first software object;
    update the first object interaction description to identify aspects of the first interaction, wherein the object interaction description aspects comprise information to allow replication of the first interaction on first software object; and
    use the first object interaction description to perform an instance of the first interaction on the instantiation of the first software object, wherein performing the instance of the first interaction causes interaction results to be generated.

25. The system of claim 24, wherein the object interaction tool operates in connection with the virtual machine.

26. The system of claim 24, wherein the object interaction tool is operable to provide software interaction sessions and generate corresponding object interaction descriptions for software objects of a plurality of different computer languages.

27. The system of claim 24, wherein the first object interaction description is stored in the memory element with a plurality of different object interaction descriptions, each object interaction description in the plurality of object interaction descriptions corresponding to a respective software interaction session within a virtual machine, the object interaction tool further configured to retrieve object interaction descriptions from memory and reconstitute the corresponding software interaction sessions.

* * * * *